United States Patent [19]

Bowman et al.

[11] 3,852,232

[45] Dec. 3, 1974

[54] RESIN COMPOSITION AND PROCESS FOR BOND SOLID PARTICLES

[75] Inventors: Richard C. Bowman, Andborn; Edward J. Lang, Grand Island; Frank S. Grazen, North Tonawanda, all of N.Y.

[73] Assignee: Hooker Chemical Corporation, Niagara Falls, N.Y.

[22] Filed: June 30, 1972

[21] Appl. No.: 267,824

Related U.S. Application Data

[63] Continuation of Ser. No. 880,397, Nov. 26, 1969, abandoned, which is a continuation-in-part of Ser. Nos. 517,423, Dec. 29, 1965, Pat. No. 3,539,484, and Ser. No. 813,702, April 4, 1969, abandoned.

[52] U.S. Cl............. 260/29.3, 260/29.4 R, 260/38, 260/39 SB, 260/DIG. 40, 260/840, 164/43
[51] Int. Cl............................................. C08g 51/24
[58] Field of Search.......... 260/39 SB, DIG. 40, 38, 260/29.4 R, 29.3, 840; 164/43

[56] References Cited

UNITED STATES PATENTS

| | | | |
|---|---|---|---|
| 3,059,297 | 10/1962 | Dunn et al.............................. | 260/38 |
| 3,184,814 | 5/1965 | Brown............................ | 260/DIG. 40 |
| 3,306,864 | 2/1967 | Lang et al.......................... | 260/17.2 |
| 3,404,198 | 10/1968 | Guyer................................ | 260/51.5 |

*Primary Examiner*—Lorenzo B. Hayes
*Attorney, Agent, or Firm*—Peter F. Casella; James F. Mudd

[57] ABSTRACT

A composition comprising a resinous binder produced by reacting urea-formaldehyde or thiourea-formaldehyde, phenol and formaldehyde in the presence of an alkaline catalyst and a solid particulate material. A process for bonding solid particles which involves heating said composition to effect setting of the resinous binder is also disclosed.

22 Claims, No Drawings

RESIN COMPOSITION AND PROCESS FOR BOND SOLID PARTICLES

REFERENCE TO PRIOR APPLICATIONS

This is a continuation of application Ser. No. 880,397, filed November 26, 1969 now abandoned which is a continuation-in-part of copending applications Ser. No. 517,423, filed Dec. 29, 1965, now U.S. Pat. No. 3,539,484, issued Nov. 10, 1970, and Ser. No. 813,702, filed Apr. 4, 1969, now abandoned.

This invention relates to new and useful improvements in the production of resin binders, to the process for applying these binders to discrete, inert solid particles, and to the compositions produced thereby.

Resin binders have been employed heretofore in the preparation of consolidated materials for bonding discrete, inert solid particles such as sand, abrasive grit, wood chips, carbon particles and the like. Foundry molds and cores, for example, are prepared by mixing sand and a suitable resin binder, and thereafter curing the composition to provide a consolidated, foundry mold or core. Wood particles of various types can be similarly employed with resin binders to provide useful consolidated wood compositions. Similarly, abrasive grit and resin binders can be employed to prepare grinding wheels and the like.

A resin binder composition that has proven commercially successful, especially because of the high cure speeds attainable when using the composition, is a binder composition comprising a liquid one-step phenol formaldehyde resin and a urea resin component, such as a urea formaldehyde. Such resin binders have become widely accepted in the foundry industry and are especially desired because of their high cure speeds. However, certain objections have been raised to the odor evolved from the resin binder during its use in the foundry process. Accordingly, it has become important to provide binder compositions that emit less odor on curing.

It is an object of this invention to provide an improved resin binder composition which overcomes disadvantages inherent in previously available binder compositions. Another object of the invention is to provide an improved resin binder capable of producing strong consolidations for applications in the foundry industries and other industries where sand or other discrete, inert solid particles are bonded. A further object of the invention is to provide an improved resin binder having comparatively high strength characteristics, rapid thermosetting properties which provide rapid operating cycles, and which also have a high degree of moisture resistance in the cured state. Still another object of the invention is to provide a resin binder composition with improved chemical structure so that the evolution of lachrymous fumes is reduced during the curing process.

In accordance with this invention, resin binder compositions of improved stability are produced by reacting a urea-formaldehyde or thiourea-formaldehyde composition having a molar ratio of urea and/or thiourea to formaldehyde in the range of 1:2 to 1:5, with a phenol and additional formaldehyde at an elevated temperature in the presence of an alkaline catalyst. Preferably additional urea or thiourea is also reacted into the composition together with the phenol and additional formaldehyde. By following the process of the invention, excellent control is provided over the evolution of obnoxious fumes or odors upon final curing of the resin.

The initial urea-formaldehyde and thiourea-formaldehyde compositions are prepared by processes which ultimately result in the formation of a urea-formaldehyde or thiourea-formaldehyde composition having a molar ratio of urea and/or thiourea to formaldehyde in the range of 1:2 to 1:5. In one such process, the components are mixed in the initial step in the foregoing ratios and are reacted at a temperature in the range of 25° to 200° C, although higher and lower temperatures can be used. The pH of the reaction mixture is regulated in the range of about 3 to 11, with the lower values of pH being used at the lower reaction temperatures and the higher values of pH at the higher reaction temperatures. The reaction is continued for a period of about 1 to 4 hours depending on the extent of reaction desired, since from one to about four molecules of formaldehyde can be reacted with each molecule of urea. The composition of the desired reaction is conveniently determined by monitoring the viscosity of the reaction mixture, as well as other control measures. The final products are usually in liquid form, and are conveniently used as such in the instant invention. In one method of forming the initial urea-formaldehyde (or thiourea-formaldehyde) composition, which method ultimately results in a more stable product, the urea and formaldehyde are initially reacted at a molar ratio of urea to formaldehyde in the range of about 1:4 to about 1:6. The pH of the solution is adjusted to the range from about 7 to 10 by the addition of a suitable amount of caustic, and additional urea is added to the reaction mixture in an amount sufficient to alter the ratio of urea to formaldehyde to the range of about 1:2 to about 1:4. The mixture is heated at a temperature of at least about 50° C, preferably at the reflux temperature, i.e., about 99° 108°C, for about 0.1 to 5 hours at atmospheric pressure. Higher temperatures, for example, up to 200°C can be employed under superatmospheric pressure. Thereafter, the reaction mixture is cooled and the pH is adjusted to the range of 5 to 6 by the addition of a suitable amount of acidic material, such as acetic acid. Then, the reaction mixture is reheated to a temperature in the range of about 50° to 100° C, preferably about 70° to 90° centigrade, and held for a period of time from about 0.1 to 2 hours. The resulting urea-formaldehyde composition has a molar ratio of urea to formaldehyde in the range of 1:2 to 1:4. Regardless of the method employed for preparation of the urea-formaldehyde, it is desired that this component be heated at a pH of about 5 to 6. Throughout this specification, disclosures with respect to urea also apply to the alternate use of thiourea.

In the preparation of the compositions of the invention, the phenol, and additional formaldehyde, and in one preferred embodiment of the invention, the additional urea or thiourea, are added to the initial urea-formaldehyde or thiourea-formaldehyde composition together with an alkaline catalyst. The additional formaldehyde is generally employed in the form of an aqueous solution of formaldehyde. Commercially available solutions generally contain about 37 weight percent formaldehyde, but other concentrations are also available. Forms of formaldehyde such as paraform, can also be used. The phenol is used in proportions sufficient to provide a heat-reactive phenolic condensate when the phenol reacts with available formaldehyde.

Such a heat-reactive condensate is produced when phenol is present in a molar deficiency with respect to the available formaldehyde, that is, when there is less than a 1:1 molar ratio of phenol to available formaldehyde. Generally the phenol to formaldehyde molar ratio added to the initial urea- or thiourea-formaldehyde composition is in the range of 1:1 to about 0.25:1. Under such conditions, a resinous material having a water tolerance or water solubility of at least about 50 percent is produced, preferably at least about 100 percent. The water tolerance is preferably in the range from about 100 to about 200, and can vary up to 300 to about 500 percent or more. The water solubility or water tolerance of a resin condensate is the amount of water, in weight percent, which when added to the resin will cause the resulting mixture to become turbid, as measured by the Smith Turbidimeter. All or part of the phenol used in the compositions of the invention can be replaced with similar phenolic compounds such as cresol, xylenol, cresylic acid, and mixtures thereof.

The additional formaldehyde and the additional urea or thiourea can be employed in the form of the compounds per se, or can be supplied by combinations of the compounds such as urea-formaldehyde or thiourea-formaldehyde concentrates. The additional urea or thiourea or equivalent concentrate is employed in a proportion to provide a molar ratio in the final composition of urea and/or thiourea to formaldehyde to about 1:4 to about 1:8. Preferably, the molar ratio is in the range of about 1:4 to about 1:6. The molar ratio of phenol to urea and/or thiourea in the final composition is generally in the range of 1:0.5 to about 1:1.5, and is preferably in the range of 1:0.6 to about 1:1.3.

Thus, the process of the invention results in the production of resins wherein the ratios of the components are generally such that the resin product has a ratio of phenol (P) plus urea and/or thiourea (U) to formaldehyde (F) of about 1:1.33 to about 1:4.8, preferably of about 1:1.5 to about 1:3.4. The urea and/or thiourea content of the resin product is generally in the range of about 4 to about 25 weight percent of the resin product.

Suitable alkaline catalysts for use in the reaction include the hydroxides of sodium, calcium, barium, potassium, lithium, rubidium and cesium. Other suitable alkaline catalysts include ammonia, the monoamines, diamines and triamines, such as diethylamine, ethylene diamine, and triethanolamine, as well as the carbonates, sulfites, bisulfites, sulfates and phosphates of the alkali metals such as sodium carbonate, sodium sulfite, sodium bisulfite, sodium sulfate, and sodium phosphate. The alkaline catalyst is used in a proportion of about 0.5 to 5 weight percent based on the weight of the phenol.

The reaction of the phenol, free formaldehyde and additional urea or thiourea with the initial urea or thiourea-formaldehyde composition is generally carried out at a temperature in the range from about 60° to about 110° C for a period of time in the range of 1 to 5 hours. In the preferred reaction sequence, the phenol is added to the initial urea- or thiourea-formaldehyde composition first, the aqueous formaldehyde solution next and the urea or thiourea is added last. Then, the reaction mixture is initially maintained at a temperature in the range of about 60° to 95° C for a period of 0.5 to 3 hours. Thereafter, the temperature of the mixture is increased to the reflux temperature, i.e., a temperature of at least about 100° C, generally in the range of about 100° to about 110° C at atmospheric pressure, and held at the reflux temperature for 0.1 to 1 hour, after which the water tolerance of the reaction mixture is determined periodically and the reaction is continued until the water tolerance reaches the desired value. The elevated temperature can be higher, for example, up to about 200° C when superatmospheric pressures up to 200 pounds per square inch are employed. Even higher temperatures can be employed at pressures over 200 pounds per square inch. Thereafter, the reaction mixture can be vacuum dehydrated to remove a portion of the water, and the pH can be adjusted to the range of 4.0 to 8.0, alternatively to the range of 4.0 to 7.0, or to the range of 6 to 8, by neutralization or acidification by reagents described hereinafter. The steps of vacuum dehydration and pH adjustment can be reversed. That is, pH can be first adjusted by adding an acidic material to reduce the pH of the reaction mixture to 4.0 – 7.0, followed by heating the resulting acidified reaction mixture at elevated temperature to remove excess water. The resulting product is an aqueous resin solution, generally containing about 10 to 50 weight percent water, preferably containing about 15 to 30 weight percent water. The product usually also contains minor amounts of unreacted phenol and formaldehyde, generally up to about 10 weight percent of either compound, usually about 5 weight percent of each compound. The resin products thus produced generally have a viscosity at 25° C between Q and Z on the GardnerHoldt scale (about 4.35 to 23 stokes), preferably a value of at least S, U or V (about 5, 6.2 or 8.8 stokes, respectively), such as in the range of S to Z. Viscosity in stokes multiplied by the density of the resin equals poises. Generally in this specification the viscosity of the resin products is given in centipoises (poise × 100), in some instances also the equivalent value on the Gardner-Holdt scale is given.

Common reagents can be used for accomplishing the pH adjustments in the process of the invention. Thus, suitable reagents for rendering the reaction mixture acidic include acetic acid, especially glacial acetic acid, formic acid, glycolic acid, other weak organic acids. Also suitable are dilute mineral acids, such as dilute hydrochloric acid, dilute sulfuric acid, dilute phosphoric acid and the like. Suitable reagents for rendering the reaction mixtures alkaline include the hydroxides of the alkali metals, such as sodium, potassium, lithium, rubidium, cesium and the alkaline earth metals such as barium and calcium, as well as the other alkaline compounds disclosed hereinbefore as catalysts.

The novel processes of the invention result in the production of resin binder compositions that have improved chemical structure so that the compositions have improved storage stability and so that a reduced amount of odor-bearing fumes or material is evolved during the curing of the resin binder composition. Even greater reduction in the amount of odor evolved is achieved by adding suitable masking agents to the final resin binder composition. Suitable masking agents include pine oil, oil of sassafras, furfuryl alcohol, vanilla extract, and many other commercially available masking agents.

Suitable curing accelerators for use in the invention when employing the resin binder compositions of the invention with inert filler particles, include aqueous solutions of strong mineral acids, such as hydrochloric acid, sulfuric acid, phosphoric acid, nitric, and the like. Organic acids such as maleic acid, toluene sulfonic acid, oxalic acid, fumaric acid, acetic acid, glycolic acid, sulfamic acid, boric acid, citric acid, and the like, are also satisfactory. Other desirable accelerators include the ammonium salts of strong mineral acids and the organic acids, such as ammonium chloride, ammonium nitrate, ammonium sulfate, monoammonium sulfate, monoammonium phosphate, diammonium phosphate, triammonium phosphate, ammonium acetate, ammonium sulfamate, ammonium borate, ammonium citrate, and mixtures thereof. In addition, the ammonium salts can be formed in situ by introducing into the resin components, the compounds capable of forming the ammonium salts. For example, acetic acid and ammonium hydroxide can be added to the mixture of resin and solid inert particles to form ammonium acetate in situ. Other salts, such as ferric chloride, zinc chloride and iron ammonium sulfate can be employed. The accelerator can be used in preparing the compositions of the invention in a solid or in an aqueous solution. Especially preferred for use in solid accelerators is ammonium chloride. Especially preferred for use in liquid accelerators is ammonium nitrate. The proportion of accelerator to the resinous binder composition is generally in the range of about 0.5 to about 30 weight percent, and is preferably in the range of about 1 to about 10 weight percent based on the total resin component solids.

The resin composition and accelerator can be combined with the discrete, inert, solid particles by several procedures. Following is a typical example:

A portion of foundry sand is introduced into a commercial muller or other suitable mixer. The accelerator is added to the sand and mixed for one-half to five minutes. Thereafter, the resin binder composition is added and mixing continues for ½ to 5 minutes to provide a "wet mixture" suitable for use in subsequent production of foundry cores.

Alternatively, the resin composition can be added to the sand first, followed by the accelerator. The resin binder and accelerator can be premixed prior to introduction to the same, but this is usually not done because of the slow curing of the resin binder that would occur at room temperature if the mixture could not be utilized in a reasonable period of time. If desired, additional urea or thiourea can be added to the accelerator prior to its use in the process. Also other additives can be used in admixture with or in conjunction with the accelerator to alter the properties of the cured consolidated articles. Useful additives also include ammonia; amines, such as dimethyl amine, ethylene diamine, and the like; and inorganic ammonium salts such as ammonium phosphate, and the like.

The proportion of the resin binder, added to the discrete solid particles is generally from about 0.2 to about 5 percent and is preferably from about 0.5 to about 5 percent of resin solids based on the weight of sand. When wood particles or refractory particles are treated, the proportion of resinous binder is generally from about 2 to about 25 percent and is preferably from about 5 to about 25 percent of resin solids based on the weight of the wood particles or refractory particles.

When sand is employed as the discrete solid particles, the resulting wet mix is suitable for foundry use, in the preparation of foundry cores and molds. When employed for these purposes, tack reducing additives such as kerosene or unctuous materials can be added to the wet mix to provide better blowing characteristics in the core blower.

The curing time of the wet mix will depend upon the concentration of the binder, the temperature conditions and the amount and type of accelerator employed. The cure time can be as little as about 3 seconds, and in some instances can range as high as 2 minutes. The curing time should be sufficient for the core to attain the strength required for it to support its own weight, and to facilitate its removal from the core box without injury. The web mixture can be used in the hot box process wherein the core box or pattern is preheated prior to introduction of the wet mixture. The temperature of the core box or pattern is generally between about 300° to 500° F, but higher or lower temperatures can be employed if desired. After the core is removed from the core box it is allowed to stand at room temperature. The residual heat in the core causes the binder in the interior of the core to cure and produces complete consolidation of the discrete particles. The heating of the wet mixture can also be accomplished by passing heated gas through the wet mixture in the core box or pattern. The core box can be preheated to a temperature from about 75° to about 300°F., usually in the range of about 150° to about 250° F. The heated gas can be air, nitrogen, oxygen, carbon dioxide, or other inert gases, and is preferably air; and is generally employed at a temperature in the range of about 100° to about 700°F., preferably about 100° to about 450°F. The heated gas or warm box process results in more efficient curing than obtained in the hot box process in that the curing is more uniform throughout the core. The improved curing results in the production of less noxious fumes and very rapid development of hot tensile strength. The heated air process has been observed to produce cleaner castings. Also there is less deformation of the cast metal products so that closer tolerances are possible.

The cores produced by the instant novel process have good resistance to deterioration due to high temperatures, high humidity, and frequent handling. In addition, the surfaces of the resulting cores are not adversely affected by conventional core washes.

While the foregoing discussion has referred to the production of sand cores, it is understood to also apply to the production of sand molds and miscellaneous sand products.

In addition to foundry sand per se, the aggregate material used in producing the foundry products of the invention can include such materials as fire clay, flyash, iron oxide, cereal, pitch, and the like. However foundry sand of various grades are most commonly employed.

When the discrete particles employed in preparing the wet mix are wood chips, flakes or other wood waste particles, or carbon particles, the wet mix may be pressed into boards or other desired shapes, then heated to temperatures of between about 300° to 500° Fahrenheit until the resin is set. The resulting consolidated particles have high strength and good water resisting properties.

As discussed above, the water tolerance or water solubility of the resin may be determined using the turbidity of a mixture of the resin with water as the end point.

The Smith Turbidimeter, which may be employed in this determination, is comprised of two adjacent enclosed chambers, one containing a source of red light and the other source of white light. A glass beaker containing a sample of the resin to be tested is placed above an opening in the top of the chamber through which a vertical beam of red light passes. A horizontal beam of white light from the other chamber is directed through the sample to intersect the vertical beam of red light. Distilled water is then added to the resin sample while agitating the mixture until the turbidity of the mixture is such that the red light beam is no longer visible. The water solubility is then determined in accordance with the following formula:

Milliliters water added × 100/weight of resin sample = percent water solubility

For water tolerance of 400 and above, a 7 gram sample is used, for water tolerances of less than 400, a 20 gram sample is used. The temperature of the water and the resin should be substantially equal during the determination. Small samples of the reaction mixture are removed periodically as the reaction progresses and are tested in this manner until the water solubility is preferably at least about one hundred percent or more. The water is miscibility can be expressed as the extent to which the water miscibility of a sample of the reaction mixture has been reduced from that extant at the beginning of the reaction, when the initial reaction mixture is completely water soluble.

The following examples are presented to define the invention more fully without any intention of being limited thereby. All parts and percentages are by weight unless specified otherwise.

Example 1 — Comparative Example

A one-step, water soluble phenol-formaldehyde resin was prepared as follows: 100 parts of phenol, 150 parts of an aqueous formaldehyde solution (37.5 percent formaldehyde), and one part of sodium hydroxide were admixed and heated to a temperature of 65° to 75° C. Mixing and heating were continued until the resulting resin showed a water tolerance of about 300 percent as determined by the Smith Turbidimeter. The resulting resin was then dehydrated to about sixty-five percent dissolved solids.

15 parts of this phenol formaldehyde resin were admixed with 15 parts of an aqueous solution of urea formaldehyde composition. The aqueous solution of urea formaldehyde composition contained about 25 percent urea, about 60 percent formaldehyde, and about 15 percent water.

The resulting resin binder was mixed with sand and accelerator as follows. The sand employed was a round grain sand having the following screen analysis:

| On 40 mesh | 0.2 percent |
|---|---|
| 70 | 20.4 |
| 100 | 45.0 |
| 140 | 20.0 |
| 200 | 11.0 |
| Through 200 mesh | 3.4 |

One and a half parts of 85 percent aqueous phosphoric acid which had been diluted with 10 parts of water, were mixed with 2,000 parts of foundry sand for 1 minute. Then 30 parts of the resin binder were added to the sand and mixed for 3 minutes. The resulting wet mix was blown into a core box to form a foundry core.

The core was heated for ½ minute at 440° F. The resulting core was found to have good strength. However, during the curing cycle, it was observed that a considerable amount of obnoxious fumes were evolved from the resin binder composition, which irritate the eyes and respiratory system of the foundry worker.

In the following examples, wherein the binder composition is made in accordance with the process of the invention, the binder compositions were employed in the preparation of foundry cores of excellent strength. However, it was observed that much less odor-bearing fumes were evolved from the resin binder compositions during the curing cycle than were experienced in the curing process carried out in Example 1.

Example 2

A reaction vessel equipped with a stirrer, thermometer and vertical water condenser was charged with 1,270 parts of an aqueous solution of urea formaldehyde composition containing about 25 percent urea, about 60 percent formaldehyde and about 15 percent water. The pH was adjusted to 9.6 by addition of 1 part of caustic, and 200 parts urea was added to the vessel. Mixture was heated rapidly to reflux and held there for 15 minutes. The solution was then cooled to 50° C and the pH was adjusted to the range of 5.1–5.8 by the addition of 1.7 parts glacial acetic acid. The solution was then reheated to 80°–85° C and held there for 45 minutes. A second charge of 15 parts caustic was immediately added and the material was cooled to 60°–65° C. 1,000 parts phenol, 1,420 parts of 37.2 percent aqueous formaldehyde solution and 720 parts of the aforesaid aqueous urea formaldehyde solution were then charged and the material was reheated to 75°–80° C, and held there for 1.5 hours. The temperature was then quickly elevated to reflux (100°–108° C) and held for 15 minutes, then quickly cooled to 70° C. The water tolerance was checked, and when it reached 135 percent, the temperature was dropped to 45°–60° C and the material was vacuum dehydrated to a refractive index of $N_D$ 1.5290. The pH was then adjusted to 7.15 by the addition of 11 parts glacial acetic acid while cooling. 2 parts of pine oil ws blended into the final resin which had the following additional properties: 165° C hot plate cure of 41–46 seconds; viscosity of 1,350 centipoises; specific gravity of 1.301; water tolerance of 118 percent; refractive index of $N_D$ 1.5315; free formaldehyde content of 9.4 percent; solids content of 72.1 percent by ASTM D-115-55; and nitrogen content of 7.42 percent.

908 parts of foundry sand were charged to a muller. Then 18.16 parts of the foregoing resin binder compositions were premixed with 3.63 parts of an accelerator mixture comprised of 21.0 percent ammonium nitrate accelerator, 38.9 percent urea, 1.3 percent ammonium hydroxide and 38.9 percent water. The resulting mixture was charged to the muller and mulled with the sand for 3 minutes. The resulting wet mix was dumped from the muller and blown at a pressure of 90 to 100 pounds per square inch gage into a pattern which was at 425° F. Molded specimens were prepared by holding the wet mix in the hot pattern for increments of time ranging from 5 to 60 seconds. After a 30 minute cooling period, the tensile strength of the specimens was determined in a Dietert Tensile Tester. The tensile strengths of the specimens are shown in Table I.

The resin binder compositions of Examples 1 and 2 were mixed with foundry sand and accelerator in a proportion of about 2 weight percent resin on the sand. The resulting wet mixes were molded into test specimens and cured at 425° F for 20 seconds. The formaldehyde evolution rate was measured for a series of test specimens for each binder composition and found to be as follows:

| Time — seconds | Total Percent Formaldehyde Evolved Based on Weight of Resin | |
|---|---|---|
| | Example 1 | Example 2 |
| | (a) | (b) |
| 15 | 0.39 | 0.10 |
| 30 | 0.62 | 0.16 |
| 45 | 0.82 | 0.20 |
| 60 | 0.96 | 0.25 |
| 75 | 1.14 | 0.29 |
| 90 | 1.25 | 0.32 |
| 105 | 1.34 | 0.33 |
| 120 | 1.41 | 0.34 |

The following accelerator mixtures were used in the foregoing tests.
a. a liquid accelerator mixture comprises of 11.9 percent ammonium chloride, 43.0 percent urea, 43.8 percent water and 1.3 percent ammonium hydroxide.
b. a liquid accelerator mixture comprised of 21.0 percent ammonium nitrate accelerator, 38.9 percent urea, 38.8 percent water and 1.3 percent ammonium hydroxides.
All accelerator mixtures were employed in about 20 percent proportions based on the weight of the resin binder.

Example 3

Using the same equipment described in Example 2, 1,270 parts of an aqueous solution of urea formaldehyde composition containing about 25 percent urea, about 60 parts formaldehyde and about 15 percent water were mixed with one part caustic and 200 parts of urea (pH of solution of 9.7) and rapidly heated to reflux temperature and held there for 30 minutes. The solution was then cooled to 50° C, and the pH was adjusted to 5.4 by the addition of 1.7 parts of glacial acetic acid. The material was then heated to 80°–85° C and held there for 30 minutes. The second caustic addition of 15 parts was immediately charged, and the solution was cooled to 60°–65° C. Then 1,000 parts phenol, 2,580 parts of 37.2 percent aqueous formaldehyde and 140 parts urea were charged to the vessel, and the temperature was elevated to 75°–80° C. After holding at 75°–80° for 1.25 hours, the temperature was rapidly increased to reflux temperature (100°–108°) and held there for 12 minutes. Solution was immediately cooled to 70° C, and checked for water tolerance. When the water tolerance fell to 182 percent, the material was cooled to 45°–60° and vacuum dehydrated to a refractive index $N_D$ 1.5250. While cooling, the pH was adjusted to 6.85 by addition of 15 parts glacial acetic acid and 2 parts oil of sassafras was blended in. The resin so produced had the following properties: 165° C hot plate cure of 58–63 seconds; viscosity of 840 centipoises specific gravity of 1.297; water tolerance of 153 percent; free formaldehyde content of 5.2 percent solids content of 72.2 percent by ASTM D-115-55, and nitrogen content of 8.25 percent.

A. 908 parts of foundry sand were charged to a muller. Then 3.63 parts of the accelerator mixture of Example 2 were added to the sand in the muller and mulled for one minute. Next 18.16 parts of the foregoing resin binder were added to the sand and mulled for 5 minutes. The resulting wet mix was dumped from the muller and blown at a pressure of 80 to 90 pounds per square inch gage into a pattern which was at 425° F. Molded specimens were prepared and tested according to the procedure of Example 2. The tensile strengths of the specimens are shown in Table I, under column 3A.

B. 908 parts of foundry sand were charged to a muller. Thereafter, the following three components were added to the sand in the muller in succession and mulled for the indicated times: 1.82 parts of water for one minute, 2.27 parts of an accelerator mixture comprised of 36.4 percent ammonium chloride accelerator, 60.7 percent urea and 2.9 percent of calcium magnesium silicate for 2 minutes, and 18.16 parts of the foregoing resin binder for 3 minutes. Then the resulting wet mixture was dumped from the muller and blown at a pressure of 80 to 90 pounds per square inch gage into a pattern which was at 425° F. Molded specimens were prepared and tested according to the procedure of Example 2. The tensile strengths are shown in Table I under column 3B.

Example 4

Using the same equipment described in Example 2, a charge of 127 parts of urea formaldehyde concentrate of Example 3, 0.1 part caustic and 18.8 parts urea with a resultant pH in the range of 8–10 was heated to reflux temperature and held there for 15 minutes. The material was then cooled to 50° C and the pH was adjusted to the range of 5.1–5.8 by addition of 0.17 part of glacial acetic acid. The solution was reheated to 80°–85° C, and held there for 45 minutes. The second charge of 1.5 parts caustic was immediately added and the material was cooled to 60°–65° C. 100 parts phenol and 258 parts of 37.2 percent aqueous formaldehyde were then added and the material was reheated to 75°–80° and held there for 1.5 hrs. Temperature was quickly elevated to reflux and held there for 15 minutes. The solution was rapidly cooled to 70° C. When water tolerance fell to about 150 percent, the temperature was dropped to 45°–60° C., and resin was vacuum dehydrated to a refractive index $N_D$ of 1.5345. While cooling, the pH was adjusted to 6.4 by the addition of 1.1 parts glacial acetic acid. 0.8 part of pine oil was blended in and a resin with the following properties resulted: 165°C hot plate cure of 55–60 seconds; free formaldehyde content of 7.4 percent; specific gravity of 1.299; viscosity of 1,420 centipoises; ASTM solids content of 71.8 percent; water tolerance of 155 percent; refractive index of $N_D$ 1.5325; and nitrogen content of 6.86 percent.

908 parts of foundry sand was charged to a muller. Then 18.16 parts of the foregoing resin binder composition were premixed with 3.63 parts of an accelerator mixture comprised of 11.9 percent ammonium chloride accelerator, 43.0 percent urea, 43.8 percent water and 1.3 percent ammonium hydroxide. The mixture was added to the sand in the muller and mulled for 3 minutes. The resulting wet mixture was dumped from the muller and blown with air pressure into a pattern which was at 425° F. Molded specimens were prepared and tested in accordance with the method of Example 2. The tensile strengths of the specimens are shown in Table I.

Example 5

Similar equipment described in Example 2 was charged with 1125 parts of the urea-formaldehyde concentrate of Example 3. The pH was adjusted to 5.6 by addition of 0.3 part glacial acetic acid and the material was heated to 80°–85° C. After maintaining the 80°–85° temperature for 30 minutes, a charge of 15 parts caustic was added to the vessel and the solution was cooled to 60° C. Then 1,000 parts phenol, 1,750 parts 37.2 percent aqueous formaldehyde solution and 150 parts urea were added to the vessel, and the temperature was elevated to 75°–80° C where it was held for 1.25 hours. The temperature was then rapidly raised to reflux and held there for 12 minutes. The resulting product was then cooled to 50° and had a water tolerance of 200 percent. The resin ws then vacuum dehydrated to refractive index $N_D$ 1.5285. While cooling the product, the pH was adjusted to 6.8 by addition of 12 parts glacial acetic acid. 5.8 parts oil of sassafras was blended in producing a resin with the following properties: 165° C hot plate cure of 48–53 seconds, viscosity of 580 cp., specific gravity of 1.277; water solubility of 182 percent; free formaldehyde content of 5.4 percent, ASTM solids content of 68.6 percent and nitrogen content of 7.16 percent.

A. The thus prepared resin binder composition ws mixed with sand and molded into specimens using the same accelerator mixture, the same proportions and the same mulling and molding procedures of Example 2. The tensile strengths of the resulting specimens are shown in Table I under column 5A.

B. The foregoing resin binder composition was also mixed with foundry sand and molded into specimens using the same accelerator mixture, the same proportions and the same mulling and molding procedures of Example 3, part B. The tensile strengths of the resulting specimens are shown in Table I, under column 5B.

Example 6

The results obtained in Examples 2 to 5 are also obtained using the same procedures, but wherein urea is replaced with thioruea.

The calculated American Foundry Society fineness number is 47.

Examples 7 – 10

A resin binder was prepared as follows: 127 parts by weight of a urea-formaldehyde composition comprised of 60 percent formaldehyde, 25 percent urea and 15 percent water, and 69.8 parts of a 37.2 weight percent aqueous solution of formaldehyde were added to a reaction vessel. While agitating the mixture, 42.8 parts of shotted urea were added and the mixture was heated to 40°–45° C and held in that temperature range until all the urea was dissolved. Thereafter, a small amount of an aqueous solution of glacial acetic acid was introduced to the reaction mixture to reduce the pH to about 5.5. The reaction mixture was rapidly heated and held in the temperature range of 80°–85° C for 35 minutes. Thereafter, 3.5 parts of a 50 percent aqueous solution of sodium hydroxide, 100 parts of phenol and 188.3 parts of a 37.2 weight percent aqueous solution of formaldehyde were added to the reaction mixture which was then heated to about 80° C and held in that temperature range for 35 minutes. The reaction mixture was heated rapidly to the reflux temperature of greater than 100° C (about 100°–105°C), held at that temperature for 9 minutes and then cooled. With the water solubility of the resin composition below 250 percent, the reaction product was vacuum dehydrated at 27–28 inches of mercury vacuum and at a temperature in the range of 45° to 60° C until the refractive index of the resin binder composition was about 1.530. The pH of the product was adjusted to about 7.0 by the addition of a small amount of a 50 percent aqueous aluminum chloride solution. The final resin properties were: 165°C hot plate cure of 70–75 seconds; free formaldehyde content of 6 percent; specific gravity 1.30; viscosity at 25°C of 1575; ASTM solids content of 70.5; water tolerance of 155 percent; refractive index of $N_D$ 1.5297 at 25°C and nitrogen content of 9.9 percent.

A liquid accelerator was prepared by charging 34.6 parts of water to a mixing vessel, heating to about 50°

Table I

| Example Number | 2 | 3A | 3B | 4 | 5A | 5B |
|---|---|---|---|---|---|---|
| Time (seconds) | Tensile Strength (pounds per square inch) | | | | | |
| 5 | 90 | 87 | 112 | — | 65 | 35 |
| 10 | 217 | 270 | 230 | 438 | 233 | 245 |
| 20 | 427 | 540 | 455 | 530 | 503 | 395 |
| 30 | 590 | 601 | 593 | 527 | 535 | 430 |
| 60 | 592 | 589 | 617 | 554 | 550 | 503 |

In the foregoing Examples 2 to 5, the foundry sand employed 10 had the following screen analysis:

| Mesh Size | Percent Sand Retained |
|---|---|
| 12 | Trace |
| 20 | 0.10 |
| 30 | 0.23 |
| 40 | 4.61 |
| 50 | 35.90 |
| 70 | 49.00 |
| 100 | 9.89 |
| 140 | 0.10 |
| 200 | Trace |
| 270 | None |
| Through 270 | Trace |

C, adding 39.4 grams of urea under agitation until the urea was completely dissolved. While maintaining the temperature in the range of 50°–55° C, the following components were added in succession, individually dissolving each component completely before adding the next: 12 parts of ammonium chloride, 12 parts of a 40 percent aqueous solution of ferric chloride, 2 parts of zinc chloride and 1 part of maleic anhydride.

In Examples 7 through 10, 908 parts by weight of Lake Shore foundry sand were added to a muller. Then, the foregoing accelerator was added to the sand in an amount corresponding to 20 weight percent of the resin binder and the mixture was mulled for 1 minute. Thereafter, the above-described resin was introduced to the muller in an amount corresponding to 2 weight percent of the sand and the components were mulled for an additional 3 minutes. The resulting wet mixture was discharged from the muller and blown into patterns in the form of "dog bone" test specimens. The patterns had been preheated. Air at a pressure of 60 pounds per square inch gauge was passed through a heater and raised to an elevated temperature and then passed through the wet mixture in the core box. With each wet mixture, a series of cured specimens were prepared by holding the wet mixture in the pattern in the presence of the hot air for dwell times of 5, 10, 15, 20, 30 and 60 seconds. For each of these conditions a series of specimens were removed from the patterns and immediately tested for "hot" tensile strength. An additional series of specimens were allowed to stand for 20 minutes to cool after removal from the pattern and were then tested for "cold" tensile strength. The results of these tests are shown in Table II together with the heated air temperature and pattern temperature.

TABLE II

| Example No. | 7 | 8 | 9 | 10 |
|---|---|---|---|---|
| Air Temperature, °F. | 400 | 400 | 300 | 300 |
| Pattern Temperature, °F. | 100 | 100 | 100 | 100 |
| Hot Tensile Strength, psi | | | | |
| Cure Time - 5 seconds | — | — | — | — |
| 10 seconds | 185 | 215 | 80 | 85 |
| 15 seconds | 255 | 300 | 135 | 115 |
| 20 seconds | 245 | 290 | 200 | 200 |
| 30 seconds | 260 | 305 | 330 | 240 |
| 60 seconds | 285 | 310 | 280 | 365 |
| Cold Tensile Strength, psi | | | | |
| Cure Time - 5 seconds | 155 | 125 | 120 | — |
| 10 seconds | 355 | 340 | 310 | 220 |
| 15 seconds | 375 | 370 | 345 | 285 |
| 20 seconds | 365 | 415 | 350 | 360 |
| 30 seconds | 410 | 440 | 395 | 350 |
| 60 seconds | 335 | 430 | 390 | 415 |

Example 11

The resin binder composition of the invention was used to prepare crucible moldings as follows: 2,080 parts of a silicon-carbide refractory were charged into a mixer, followed by addition of 52 parts of the powdered accelerator mixture used in Example 3, part B. The mixture was agitated until it was homogeneous. Then 468 parts of the resin binder of Example 3 was added to the mixer and mixing was continued until a substantially homogeneous wet mixture was obtained. The wet mixture was dumped from the mixer and placed in molds. The wet mixture in the molds was pressed at 1,000 pounds per square inch force, and aged for several hours, and then heated up to 260° C to produce the cured, molded crucible specimens.

Excellent results are also obtained using the procedure of Example 7, but replacing the silicon carbide refractory with other carbon products such as graphite, as well as other refractory materials such as alumina, silica and the like. Curing temperatures are 300° to 500°F.

Example 12

Consolidated wood articles, such as composition board, are prepared as follows: 100 parts of wood flake are placed in a horizontal rotating drum. Then 8 parts of the resin binder composition prepared in Example 2 and 1.6 parts of the accelerator mixture employed in Example 2 are mixed and sprayed onto the wood flakes while the drum was rotated at a speed of about ten revolutions per minute. A period of about 8 minutes was required to spray the resin solution on the wood flakes. A wooden frame with an opening of about 24 inches by 24 inches and a height of about 8 inches was placed on a steel caul and a sufficient amount of the coated wood flakes were sprinkled on the caul to substantially fill the frame. Another steel caul was placed on top of the flakes and placed in a hot press. The press was closed to stops producing a board having a density of 40 pounds per cubic foot. The temperature in the press was above 325° F, and the board was retained in the press for a period of 11 minutes. The maximum internal temperature of the board was about 230° F. The board on removal from the press had an excellent appearance.

Various modifications can be made in the invention without departing from the spirit thereof. Therefore, the foregoing specification is intended to illustrate the invention but not to limit it.

We claim:

1. In a process for bonding discrete solid particles which comprises admixing said particles with an aqueous resin binder composition and a curing accelerator selected from the group consisting of acids and salts to yield a wet mixture, and heating the resulting wet mixture to effect setting of the resinous components;

the improvement comprising employing a resinous binder composition prepared by reacting a urea composition selected from the group consisting of a urea-formaldehyde and a thiourea-formaldehyde having a molar ratio of urea and/or thiourea to formaldehyde in the range of about 1:2 to about 1:5 and which has been heated at a temperature in the range of about 50 to 100 degrees centigrade at a pH of about 5 to 6, with a phenol and formaldehyde in the presence of an alkaline catalyst at a temperature of at least about 100 degrees centigrade, said phenol and added formaldehyde employed in a molar ratio in the range of about 0.25:1 to 1:1 to produce a resin binder composition having a total molar ratio of urea and/or thiourea to formaldehyde of about 1:4 to about 1:8, and a water tolerance of at least 50 percent.

2. The process of claim 1 wherein the discrete solid particles are sand.

3. The process of claim 1 wherein the discrete solid particles are wood.

4. The process of claim 1 wherein the discrete solid particles are a refractory material.

5. The process of claim 2 wherein the wet mixture is introduced to a hot core box to form a core of a desired shape, whereby the wet mixture is heated to effect setting of the resinous components.

6. The process of claim 5 wherein the curing accelerator is ammonium chloride.

7. The process of claim 5 wherein the curing accelerator is an aqueous solution of ammonium nitrate.

8. The process of claim 2 wherein the wet mixture is introduced to a core box which is at a temperature in the range of about 75° to about 300° F, and heated gas is passed through the wet mixture, to effect setting of the resinous components.

9. The process of claim 8 wherein the curing accelerator is ammonium chloride.

10. The process of claim 3 wherein the wet mixture is pressed into a form of the desired shape, and the shaped wet mixture is heated to effect setting of the resinous components.

11. The process of claim 4 wherein the wet mixture is pressed into a form of the desired shape, and the shaped wet mixture is heated to effect setting of the resinous components.

12. A composition comprising discrete solid particles, and a resinous binder composition prepared by reacting a urea composition selected from the group consisting of a urea-formaldehyde and a thiourea-formaldehyde having a molar ratio of urea and/or thiourea to formaldehyde in the range of about 1:2 to about 1:5 and which has been heated at a temperature in the range of about 50 to 100 degrees centigrade at a pH of about 5 to 6, with a phenol and formaldehyde in the presence of an alkaline catalyst at a temperature of at least about 100 degrees centigrade, said phenol and added formaldehyde employed in a molar ratio in the range of about 0.25:1 to 1:1 to produce a resin binder composition having a molar ratio of urea and/or thiourea to formaldehyde of about 1:4 to about 1:8, and a water tolerance of at least 50 percent.

13. The composition of claim 12 wherein the discrete solid particles are sand and the resin binder composition is present in a proportion of about 0.2 to 5 weight percent based on the weight of the sand.

14. The composition of claim 12 wherein the discrete solid particles are wood and the resin binder composition is present in a proportion of about 2 to about 25 weight percent based on the weight of the wood particles.

15. The molded composition of claim 12 wherein the discrete solid particles are refractory particles and the resin binder composition is present in proportion of about 2 to 25 weight percent based on the weight of the refractory particles.

16. In a process for bonding discrete solid particles which comprises admixing said particles with an aqueous resin binder composition and a curing accelerator selected from the group consisting of acids and salts to yield a wet mixture, and heating the resulting wet mixture to effect setting of the resinous components;
the improvement comprising employing a resinous binder composition prepared by reacting a urea composition selected from the group consisting of a urea-formaldehyde and a thiourea-formaldehyde having a molar ratio of urea and/or thiourea to formaldehyde in the range of about 1:2 to about 1:5 and which has been heated at a temperature in the range of about 50° to 100° C at a pH of about 5 to 6, with a phenol, formaldehyde and a urea compound selected from the group consisting of urea and thiourea, in the presence of an alkaline catalyst at a temperature of at least about 100° C, said urea or thiourea employed in a proportion to provide a molar ratio of urea and/or thiourea to formaldehyde of about 1:4 to 1:8 in the resin binder composition; and said phenol employed in a proportion to provide a total molar proportion of phenol or urea and/or thiourea in the range of about 1:0.5 to about 1:1.5 in the resin binder composition, which has a water tolerance of at least 50 per cent.

17. The process of claim 16 wherein the discrete solid particles are sand.

18. The process of claim 17 wherein the wet mixture is introduced to a hot core box to form a core of a desired shape, whereby the wet mixture is heated to effect setting of the resinous components.

19. The process of claim 18 wherein the curing accelerator is ammonium chloride.

20. The process of claim 20 wherein the curing accelerator is an aqueous solution of ammonium nitrate.

21. A composition comprising discrete solid particles, and a resinous binder composition prepared by reacting a urea composition selected from the group consisting of a urea-formaldehyde and a thiourea-formaldehyde in the range of about 1:2 to about 1:5 and which has been heated at a temperature in the range of about 50° to 100° C at a pH of about 5 to 6, with a phenol, formaldehyde and a urea compound selected from the group consisting of urea and thiourea, in the presence of an alkaline catalyst at a temperature of at least about 100° C, said urea or thiourea employed in a proportion to provide a molar ratio of urea and/or thiourea to formaldehyde of about 1:4 to about 1:8 in the resin binder composition; and said phenol employed in a proportion to provide a total molar ratio of phenol to urea and/or thiourea in the range of about 1:0.5 to about 1:1.5 in the resin binder composition, which has a water tolerance of at least 50 percent.

22. The composition of claim 21 wherein the discrete solid particles are sand and the resin binder composition is present in a proportion of about 0.2 to 5 weight percent based on the weight of the sand.

* * * * *